United States Patent [19]
Pausch

[11] 3,798,878
[45] Mar. 26, 1974

[54] FILTER CLEANING APPARATUS
[75] Inventor: Josef Pausch, Wayzata, Minn.
[73] Assignee: General Resource Corporation, Hopkins, Minn.
[22] Filed: Aug. 18, 1972
[21] Appl. No.: 281,792

[52] U.S. Cl. .......................... 55/96, 55/293, 55/302
[51] Int. Cl. ............................................. B01d 46/04
[58] Field of Search ............ 55/302, 341, 461, 293, 55/379, 96; 261/76, 77, 78; 138/37, 40, 44

[56] References Cited
UNITED STATES PATENTS

| | | |
|---|---|---|
| 3,499,268 | 3/1970 | Pausch ................................ 55/302 |
| 3,394,532 | 7/1968 | Oetiker ................................ 55/302 |
| 3,538,687 | 11/1970 | Pausch ................................ 55/302 |
| 3,606,736 | 9/1971 | Leliaert et al. ....................... 55/341 |

*Primary Examiner*—Frank W. Lutter
*Assistant Examiner*—David Lacey

[57] ABSTRACT

Apparatus for removing accumulations of dust from the exterior surface of a dust filter bag including means for injecting a high energy gas into the bag interior through an orifice and a bowl-shaped element having a restricted throat diameter, where the orifice size and throat diameter are of a preferred size ratio for maximizing the gas pressure.

8 Claims, 5 Drawing Figures

PATENTED MAR 26 1974    3,798,878

CURVE A : EXPERIMENTAL CURVE FOR DIFFUSER
CURVE B : EXPERIMENTAL CURVE FOR NO DIFFUSER

REGION 30 RELATIVE PRESSURE $$\text{RATIO} = \frac{\text{DIAMETER OF THE BELLMOUTH THROAT}}{\text{DIAMETER OF THE ORIFICE 21}} = \frac{D_2}{D_1}$$

FILTER CLEANING APPARATUS

This invention relates to improvements in the self-cleaning apparatus of dust filters comprising a plurality of porous filtering bags which are each periodically backwashed by the application of a jet or burst of clean gas in a manner to cause accumulated dust particles and solids to be removed from the porous bag surface.

Prior art arrangements have been described for discharging accumulated dust from porous filter bags by backwashing with clean gas. My U. S. Pat. No. 3,436,899 describes the injection of a high energy gas into the interior of a porous filter bag, which gas is accelerated to a supersonic speed and forms waves or vibrations in the flexible bag surface to discharge accumulated solids. My U. S. Pat. No. 3,499,268 describes an improvement in the apparatus for forming the high energy gas wave in a manner which increases the high pressure backwash cleaning force. The object of that invention was to provide an apparatus for inducing a larger volume of air under considerable pressure into the interior of the porous filter bag.

It is an object of the present invention to further improve the performance of a backwash cleaning apparatus by increasing the backwash pressure which is induced into the interior of the porous filter bag.

It is another object of this invention to provide an increased backwash pressure without the necessity of increasing the pressure of the gas reservoir source which is used with the backwash apparatus.

It is a further object of this invention to maximize the performance of a backwash apparatus having a bowl-shaped structure adjacent the filter bag backwash intake opening.

It is a principal object of this invention to provide an optimum determination of air jet orifice size and bellmouth throat diameter for maximum pressure development in a gas jet backwash apparatus of the type having a bowl-shaped element for receiving the high energy gas jet.

Other and further objects and advantages of the present invention will become apparent from the following specification and claims, and in the appended drawings in which:

Figure 1:
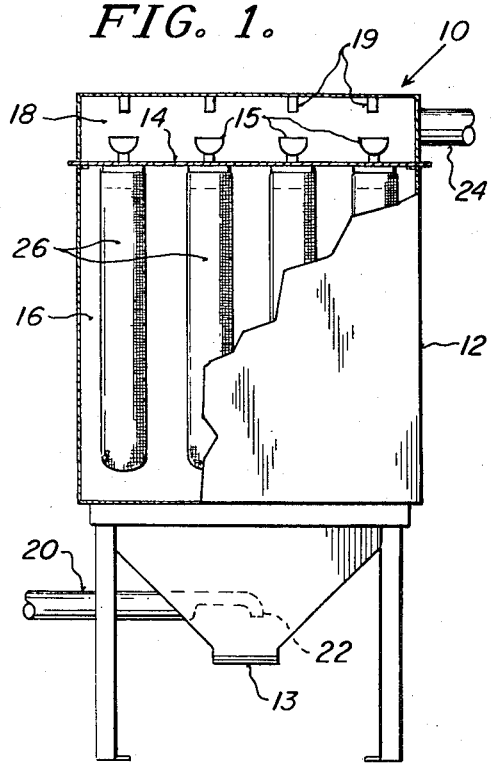
FIG. 1 is a sectional view through a chamber of a dust filtering apparatus in which the present invention is embodied.

Referring to FIG. 1, reference numeral 10 indicates in partial cross section a form of apparatus for the collection and filtering of dust particles from a gas such as air. The apparatus is enclosed on all sides by casing 12. The interior of the apparatus contains a horizontal barrier 14 which divides the internal area into two chambers, a lower dust-air receiving chamber 16 and an upper clean air chamber 18. The dirty air mixture to be filtered is drawn into casing 12 by conduit 20 which has a downwardly projecting outlet 22. The clean air chamber 18 has a discharge duct 24 connected thereto and a fan or blower, not shown, is connected to the discharge duct to create a pressure drop between inlet 20 and discharge duct 24, thereby drawing air from the inlet through the filter apparatus to the discharge duct. A dust collection bin 13 at the bottom of the filter apparatus provides a means for collecting and discharging accumulated dirt and dust particles.

The interior of casing 12 has a plurality of filter bags 26, each constructed from a flexible porous fabric. The interior of each bag is supported by a wire frame, not shown, which prevents the flexible bag from collapsing during the filtering cycle. Each bag is open to the clean air chamber 18 at its upper end, via bowl-shaped members 15 and holes 17 (see FIG. 2).

Figure 2:
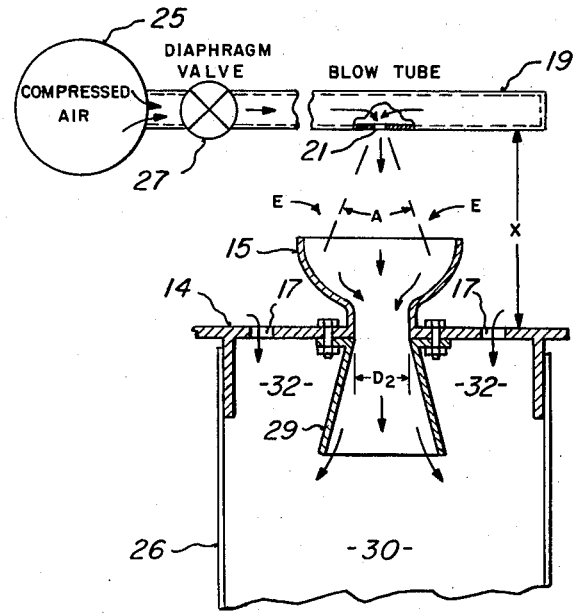
FIG. 2 is an enlarged sectional view of the backwash inlet area and a diagrammatic view of the backwash apparatus.

In a typical operating cycle of dust filtering apparatus 10, dirty air is drawn into chamber 16 through conduit 20 and outlet 22. The heavier dirt particles drop to collection bin 13 and the lighter dust-air mixture accumulates throughout chamber 16. This air is drawn through filter bags 26 into their interiors and out their open ends via bowl-shaped members 15. The air exiting from bowl-shaped members 15 has been filtered, and passes into clean air chamber 18 and out discharge duct 24. Because the filter bags tend to accumulate a layer of dust during continued operation, it becomes necessary to periodically clean the accumulated dust from the bag surfaces. This is accomplished by means of a backwash air jet which is forced into the bag openings via orifices 21 (see FIG. 2) contained in blow tubes 19. The end view of a plurality of blow tubes can be seen in FIG. 1, and their side view is illustrated in FIG. 2. These blow tubes are typically rectangular in shape for ease of construction.

Referring now to FIG. 2, the inventive apparatus is shown in partial cross section and diagramatically. Compressed air tank 25 serves as a reservoir of high pressure air, typically at a pressure of 100 p.s.i. The release of this high pressure air is controlled by means of diaphragm valve 27, which can be any of a number of commercial valve types available for this application. The pipe connecting compressed air tank 25 to diaphragm valve 27 is typically about ¾ inch in diameter. The outlet of diaphragm valve 27 is connected to a section of blow tube, which section is rectangular in cross section and each side dimension is approximately 1¼ inches. Blow tube 19 extends over the bowl-shaped members 15 of a plurality of aligned filter bags at a distance X above the ends of the filter bag openings. The choice of the value of X will be described hereinafter. Positioned directly above each bowl-shaped member 15 is an orifice 21 in blow tube 19. FIG. 2 illustrates the relationship of the orifice 21 for a single filter bag, and it is to be understood that each other filter bag has a similar arrangement. The diameter and shape of orifice 21 is illustrated in FIG. 3 and will be discussed in more detail hereinafter. In FIG. 2 the direction air flow is shown by means of arrows.

When diaphragm valve 27 is opened, a blast of compressed air quickly fills blow tube 19 and causes a high energy air jet to emit from orifice 21. This air jet flows out from orifice 21 and is captured by bowl-shaped member 15. The air jet is then compressed toward the bottom of member 15 through a bellmouth throat of diameter $D_2$, and out through diffuser element 29. Because of the supersonic speed of the air flow through diffuser 29 the pressure and velocity into region 30 of the filter bag interior is very high. The action of this high pressure air moving rapidly out of diffuser 29 creates a zone of reduced pressure near the top of the filter bag, in the region denoted as 32 in FIG. 2. This low pressure region causes additional air to be drawn through holes 17 into the top of the filter bag to aid in propagating the high pressure air pulse down the interior bag surface.

The distance X between the blow tube 19 and the top of the filter bag assembly is determined by well known theoretical and experimental relationships. For example, in the book entitled "Plant and Process Ventilation," by W. C. L. Hemeon, The Industrial Press, Second Edition (1963) it is disclosed (p. 204) that an air stream emitting from an orifice expands over an angle of 28°. This angle is illustrated as A in FIG. 2. Therefore, in order for bowl-shaped member 15 to be positioned properly to capture the expanding jet stream, the blow tube 19 must be positioned at a distance X above bowl-shaped member 15 to allow the outer edge of the expanding jet stream to fall within the bowl. For design convenience this is illustrated in FIG. 2 as falling approximately half way up the semi-circular bowl surface.

The above-mentioned reference also discloses, beginning at page 200, another phenomena which is utilized in the present invention. This phenomena is known as air entrainment and can be simply described as the addition of external air flow to a jet stream at points away from the jet stream nozzle. The entrainment ratio is defined as the ratio of the rate of air flow at some distance from the nozzle, to the rate of air flow at the nozzle, and is directly proportional to the distance from the nozzle. The addition of external air caused by the entrainment phenomena is diagramatically illustrated in FIG. 2 by the arrows labeled E. These arrows illustrate that ambient air outside the jet stream is drawn into and accumulated to increase the net rate of air flow into the bowl-shaped member. It is this total air flow that is compressed through the bellmouth throat at the base of bowl-shaped member 15.

In addition to the results and phenomena I have described above, I have discovered that the relative sizes of orifice 21 and the bellmouth throat at the base of bowl-shaped member 15 are critical to obtaining optimum results. The ratio of the diameter of the bellmouth throat, denoted as $D_2$ in FIG. 2, and diameter of the orifice 21 opening, denoted as $D_1$ in FIG. 3, determine the pressure which will be felt in region 30 of the air filter bag. While the precise scientific explanation for this discovery is unknown to me at the present time, I have proven experimentally that the air pressure propagated into the filter bag interior can be markedly improved by selecting the proper ratio $D_2/D_1$. FIG. 4 illustrates graphically the optimum ratio to be slightly greater than 7, and that this ratio yields a significant pressure rise in region 30 over other ratios both lower and higher than 7. For example, in one experiment a maximum pressure was measured in region 30 when the ratio $D_2/D_1$ was 7.33. When the ratio was lowered to 5.5 the pressure dropped 16 percent, and when the ratio was raised to 11 the pressure dropped by 40 percent. This discovery enables the optimum performance from a given size compressed gas reservoir, and thereby allows the most economic design for a specified pressure requirement.

FIG. 4 also illustrates another discovery which I have made. Curve A shows the pressure variations at respective ratios $D_2/D_1$ for the case where diffuser 29 is included as a part of the apparatus. Curve B illustrates corresponding pressure variations without the use of diffuser 29. It has been known in the art that the addition of a diffuser element improves performance of an apparatus of this type, at some cost, but FIG. 4 illustrates that an even greater improvement can be achieved by adjusting the ratio $D_2/D_1$. Therefore, an economy of design and manufacture can be achieved by adjusting the ratio, a very inexpensive alternative, and by eliminating the more costly diffuser 29. Of course, in cases where economy of design is not the sole criteria, it is apparent that the use of both the optimum ratio and diffuser 29 will give the best performance.

Figure 3A:
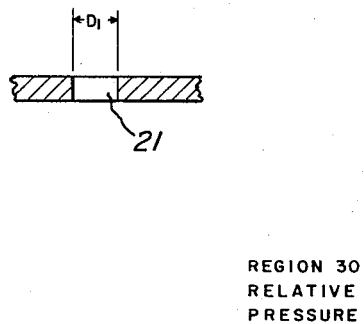
FIGS. 3A and 3B are enlarged cross-sectional views of orifices which can be used with the invention.
Figure 3B:
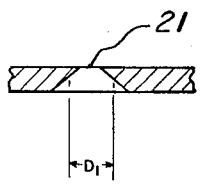
Figure 4:
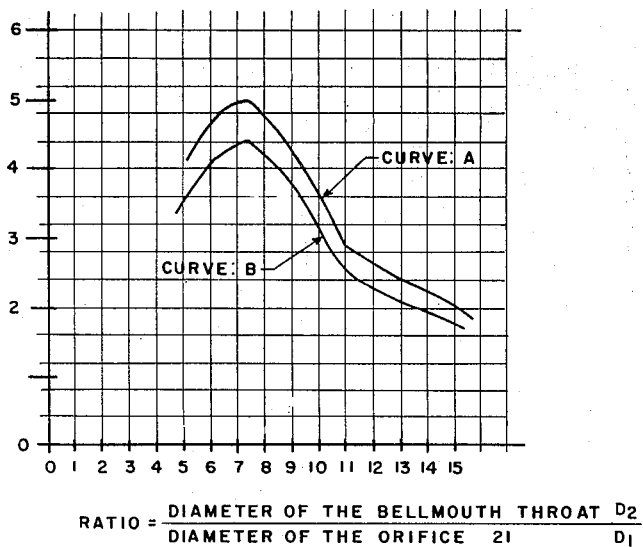
FIG. 4 illustrates graphically the dependence of backwash air pressure on orifice and bellmouth throat diameters.

FIG. 3A illustrates in cross section an orifice of diameter $D_1$ which is obtained by drilling a straight hole through the bottom of blow tube 19. FIG. 3B illustrates an orifice 21 formed by drilling a tapered hole, shown with a greatly exaggerated taper, through blow tube 19. In this case, the determination of the optimum ratio $D_2/D_1$ is made by measuring the median diameter of the tapered hole, as indicated in FIG. 3B. My experiments have shown that a tapered hole gives increased performance. This performance improvement may amount to approximately 13 percent. Therefore, the use of a tapered hole in combination with the other inventive features I have described results in an apparatus having the best performance characteristics. The tapered hole serves to minumize losses due to high pressure air flow, and the degree of taper is primarily a matter of design choice. I have found that a tapered hole having a mimimum diameter of approximately 5 percent less than the maximum diameter gives satisfactory results.

I claim:

1. In an apparatus for the cleaning of dust filter bags by the application of a high-energy back wash gas from a compressed gas reservoir to the interior of a dust filter bag, the improvement comprising:
   a. a blow tube connected to said compressed gas reservoir and having an orifice of diameter $D_1$ aligned above said dust filter bag;
   a bowl-shaped receptacle positioned beneath said orifice a distance determined by projecting a 28° spherical angle from said orifice downwardly, said distance being sufficient to allow the projection of said spherical angle to intersect within the interior surface of said bowl-shaped receptacle, said bowl-shaped receptacle having a throat of diameter $D_2$ connected to said dust filter bag interior via a perforated cover plate; and
   c. the ratio of said throat diameter $D_2$ to said orifice diameter $D_1$ being greater than 5 and less than 10.

2. The improvement of claim 1 wherein said orifice has an outward taper toward said bowl-shaped receptacle.

3. The improvement of claim 2 wherein the ratio $D_2/D_1$ is substantially equal to seven.

4. The improvement of claim 1 wherein the ratio $D_2/D_1$ is substantially equal to seven.

5. The apparatus of claim 1, further comprising:
   d. a conical diffuser element mounted in axial alignment with said bowl-shaped receptacle and having a minor diameter $D_2$ equal to and adjacent said throat and having its major diameter projecting into said filter bag.

6. The apparatus of claim 5 wherein said orifice has an outward taper toward said bowl-shaped receptacle.

7. The apparatus of claim 5 wherein said ratio is substantially equal to seven.

8. A method of cleaning dust filter bags by the application of a high-energy backwash gas from a compressed gas reservoir to the interior of the dust filter bag, comprising the steps of:
   a. emitting a gas jet pulse from an orifice of diameter D, aligned above said dust filter bag;
   b. collecting said gas jet pulse in a bowl-shaped receptacle positioned beneath said orifice and constricting the cross-sectional area of said pulse through a throat of diameter about seven times D in said bowl-shaped receptacle;
   c. passing said constricted-area pulse through a conical diffuser having a minor diameter about seven times D and a larger major diameter projecting into said filter bag to allow expansion of said constricted area pulse; and
   d. delivering said expanding pulse into the interior of said dust filter bag.

* * * * *